(12) United States Patent
Ory

(10) Patent No.: US 8,955,872 B2
(45) Date of Patent: Feb. 17, 2015

(54) IN-DASHBOARD AIRBAG FLAP ARRANGEMENT COMPRISING A TIE HAVING OVERMOLDED ELEMENTS

(75) Inventor: Daniel Ory, Le Plessis-Bouchard (FR)

(73) Assignee: Faurecia Interieur Industrie, Nanterre (FR)

( * ) Notice: Subject to any disclaimer, the term of this patent is extended or adjusted under 35 U.S.C. 154(b) by 24 days.

(21) Appl. No.: 13/882,145

(22) PCT Filed: Oct. 28, 2011

(86) PCT No.: PCT/EP2011/069041
§ 371 (c)(1),
(2), (4) Date: Jul. 10, 2013

(87) PCT Pub. No.: WO2012/056021
PCT Pub. Date: May 3, 2012

(65) Prior Publication Data
US 2014/0145418 A1 May 29, 2014

(30) Foreign Application Priority Data
Oct. 28, 2010 (FR) ...................................... 10 58893

(51) Int. Cl.
*B60R 21/216* (2011.01)
*B60R 21/215* (2011.01)

(52) U.S. Cl.
CPC ............. *B60R 21/215* (2013.01); *B60R 21/216* (2013.01)
USPC .................................................... 280/728.3

(58) Field of Classification Search
CPC ..................................................... B60R 21/216
USPC ..................................................... 280/728.3
See application file for complete search history.

(56) References Cited

U.S. PATENT DOCUMENTS

| | | | |
|---|---|---|---|
| 5,072,967 A * | 12/1991 | Batchelder et al. | 280/732 |
| 5,195,776 A * | 3/1993 | Sakakida et al. | 280/732 |
| 5,372,379 A * | 12/1994 | Parker | 280/728.3 |
| 5,478,107 A * | 12/1995 | Yamagishi et al. | 280/728.3 |
| 5,533,746 A * | 7/1996 | Whited | 280/728.2 |

(Continued)

FOREIGN PATENT DOCUMENTS

| | | |
|---|---|---|
| DE | 10160185 | 6/2003 |
| EP | 0722862 | 7/1996 |
| FR | 2941195 | 7/2010 |

OTHER PUBLICATIONS

International Search Report for PCT/EP2011/069041 dated Jan. 31, 2012, 2 Pages.

(Continued)

*Primary Examiner* — Nicole Verley
(74) *Attorney, Agent, or Firm* — Reising Ethington P.C.

(57) ABSTRACT

The invention relates to an inflatable airbag arrangement in a motor vehicle dashboard, the arrangement comprising a flap (4) hinged to a dashboard body (2) to open when on inflation of the airbag, and having a linear tie (1) therein fastened to the flap (4) and to the dashboard body (2). According to the invention, additional elements (21 to 26) are overmolded on the tie (1), each overmolded additional element (21 to 26) having a specific outside shape that engages in a corresponding housing in the flap (4) and/or in the dashboard body (2), the tie (1) being put into position in the airbag arrangement by the additional elements (21 to 26) being engaged in the corresponding housings in the flap (4) and in the dashboard body (2).

8 Claims, 2 Drawing Sheets

(56) References Cited

U.S. PATENT DOCUMENTS

| | | | |
|---|---|---|---|
| 6,082,760 A * | 7/2000 | Ukai et al. | 280/728.3 |
| 6,131,945 A | 10/2000 | Labrie | |
| 6,601,870 B2 * | 8/2003 | Suzuki et al. | 280/728.3 |
| 7,118,123 B2 * | 10/2006 | Weissert et al. | 280/728.3 |
| 7,249,781 B2 * | 7/2007 | Kai et al. | 280/728.3 |
| 7,249,782 B2 * | 7/2007 | Weissert et al. | 280/728.3 |
| 7,367,587 B2 * | 5/2008 | Taoka | 280/751 |
| 8,376,395 B2 * | 2/2013 | Ory | 280/728.3 |
| 8,500,158 B2 * | 8/2013 | Ory | 280/728.3 |
| 8,579,325 B2 * | 11/2013 | Roychoudhury | 280/752 |
| 8,602,446 B2 * | 12/2013 | Ory et al. | 280/728.3 |
| 8,657,328 B2 * | 2/2014 | Ory | 280/728.3 |
| 8,714,583 B2 * | 5/2014 | Tromp | 280/728.3 |
| 2003/0020269 A1 * | 1/2003 | Muhlbach | 280/743.2 |
| 2005/0121818 A1 | 6/2005 | Cowelchuk | |
| 2012/0032467 A1 * | 2/2012 | Ory | 296/72 |
| 2013/0193674 A1 * | 8/2013 | Ory et al. | 280/728.3 |

OTHER PUBLICATIONS

Search Report for FR 1058893, dated Jun. 20, 2011, 2 pages.

* cited by examiner

IN-DASHBOARD AIRBAG FLAP ARRANGEMENT COMPRISING A TIE HAVING OVERMOLDED ELEMENTS

TECHNICAL FIELD

The invention relates to installing a flap that is fitted to an opening in a dashboard body of a motor vehicle, the flap masking an inflatable airbag carried on the rear face of the dashboard.

BACKGROUND OF THE INVENTION

In such an arrangement, the dashboard, which is situated in the vehicle cabin under the windshield, comprises a dashboard body having a bottom face carrying an inflatable airbag module that comprises an enclosure containing the airbag and the means for inflating it, arranged facing the corresponding opening in the dashboard body.

The opening is closed by one or more flaps having an edge hinged to the dashboard body, and a spacer-forming firing channel is interposed between the airbag module and the bottom face of the dashboard body.

The top face of the flap and of the dashboard body is generally covered in a covering, e.g. constituted by foam that is in turn covered by a skin, so as to make the flap more or less invisible in the top face of the dashboard body.

When an impact is detected, the airbag inflates automatically so as to exert pressure against the bottom face of the flap, thereby causing it to open against resistance of the covering, which is torn, thereby and thus enabling the airbag to deploy and place itself between an occupant of the vehicle and the dashboard.

The opening of the flap and full inflation of the airbag take place over a length of time that must be short enough to protect the occupant of the vehicle by preventing the occupant's head striking the dashboard or the windshield under the effect of the impact.

Given the forces involved, it can happen that the flap strikes the windshield while it is opening, and then breaks up in part against the windshield.

In this context, document FR 2 941 195 provides for retaining ties that are fastened to the bottom face of the flap and to the dashboard body, and that extend across the side edges of the flap and the opening that it closes.

When the flap opens, these ties tend to limit the angular amplitude through which the flap can open so as to prevent it from striking the windshield, while nevertheless allowing the flap to open fast.

The ties used in that type of application are made of a material that presents considerable elasticity, so that it can still happen that opening the flap causes the flap to contact the windshield.

OBJECT OF THE INVENTION

An object of the invention is to propose a solution for remedying that drawback by improving control over the extension of the tie in order to limit the risk of contacting the windshield.

SUMMARY OF THE INVENTION

In accordance with an embodiment of the invention, there is provided an inflatable airbag arrangement in a motor vehicle dashboard, the arrangement comprising a flap hinged to a dashboard body in order to open when the airbag is inflated, and in which a linear tie is fastened to the flap and to the dashboard body in order to limit the amplitude of the movement of the flap when it opens, the arrangement being characterized in that additional elements are overmolded along portions of the tie, these portions of the linear tie being embedded in the material of the additional elements, said overmolded additional elements having specific outside shapes suitable for being snap-fastened in corresponding housings rigidly secured to the flap and/or to the dashboard body, and in that the tie is positioned in the airbag arrangement and is fastened to said arrangement by snap-fastening of the additional elements in the corresponding housings.

With this solution, the tie is put into position in the arrangement in a manner that is simple and accurate, such that each tie portion that limits opening of the flap has a length that corresponds accurately to a nominal value.

The rigid elements constituting each additional element enable the tie to be positioned better, in particular in its loops, if any, and furthermore the tie does not lengthen in the portions that are embedded in an overmolded element, thereby contributing to increasing control over the lengthening of each portion of the tie, in particular in its loops, if any.

The behavior of the tie is thus identical from one example of the arrangement to another, such that a situation in which the length of the retaining portion is too short is practically eliminated.

In addition, overmolding a portion of the tie serves to increase its strength during deployment of the inflatable airbag so as to avoid the tie breaking.

The invention also provides an arrangement as defined above, including at least one element overmolded along at least one portion of the tie and having an outside shape that co-operates with the shape of the housing that receives it to hold the position and the direction of the tie locally.

The invention also provides an arrangement as defined above, including at least one element overmolded along at least one portion of the tie, the element having an outside shape with one or more snap-fastener prongs for snap-fastening in the corresponding housing.

The invention also provides an arrangement as defined above, including at least one element overmolded along at least one portion of the tie, which element has an outside shape including one or more ribs for enabling said element to be bonded by welding to the housing in which it engages.

The invention also provides an arrangement as defined above, wherein the tie is a linear tie forming a single closed loop.

The invention also provides an arrangement as defined above, wherein the tie constitutes a single closed loop, having its ends secured to each other by stitching.

The invention also provides an arrangement having a firing channel rigidly secured to the dashboard body and surrounding the flap, wherein the flap includes a flap body and flap reinforcement rigidly secured to each other, and wherein the tie is fastened to the dashboard body and/or to the flap by additional elements overmolded on the tie and snap-fastened in corresponding housings formed in the firing channel and/or in the flap reinforcement, which firing channel and flap reinforcement are rigidly secured respectively to the dashboard body and to the flap body.

The invention also provides a motor vehicle fitted with an arrangement as defined above.

DETAILED DESCRIPTION OF THE ILLUSTRATED EMBODIMENTS

In the illustrated embodiments, there is provided an airbag flap arrangement having a tie with additional elements that are overmolded on the tie and that engage in corresponding housings in the bottom face of the flap and/or of the dashboard body to enable the tie fitted with its overmolded elements to be installed quickly and accurately. It can be understood that the engagement corresponds more exactly to snap-fastening. Naturally, the idea is not only to hold the additional elements in their positions, but also to retain them while the inflatable airbag is being deployed.

Figure 1:
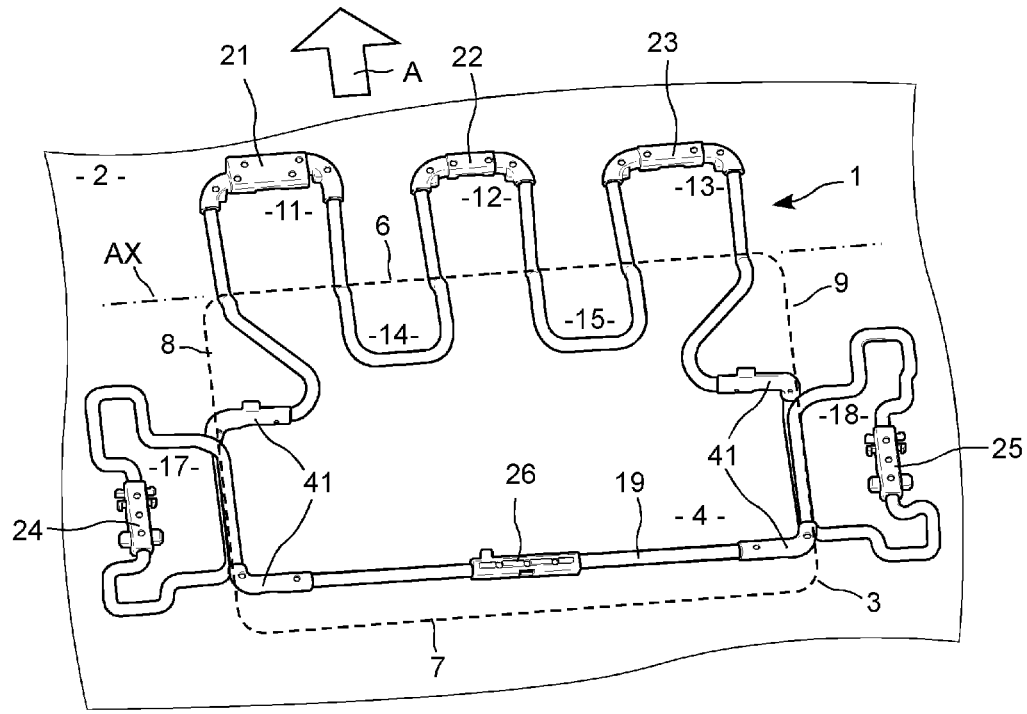
FIG. 1 is an overall view of the tie of an arrangement, of the invention.

The tie in the arrangement of the invention, given reference 1 in FIG. 1, is for fastening to the bottom face of a dashboard body 2 that includes a generally rectangular opening 3, which opening is closed by a flap 4.

The flap 4 has a front transverse edge 6 that is its edge closest to the windshield, and that coincides with the transverse axis AX around which the flap 4 pivots when it opens. The flap also has a rear transverse edge 7 that corresponds to its opening edge, and two side edges 8 and 9 situated respectively on the left and on the right relative to the forward direction A of the vehicle.

The tie 1 that is fastened to the bottom face of the flap 4 and to the dashboard body 2 has five loops 11, 12, 13, 17, and 18 situated outside the outline 3 in order to be fastened to the dashboard body, together with two loops 14 and 15 that are situated inside this outline 3 in order to be fastened to the flap.

Each loop is a portion of the tie 1 that has a shape that corresponds generally to the shape of the letter U, thus comprising two strands that are united by a portion in the shape of a handle or of part of a ring.

The loops 11, 12, and 13 are situated beside one another along the front transverse edge 6 against the dashboard body 2, while the loops 14 and 15 are situated one beside the other along the edge 6, but against the body of the flap 4.

The assembly constituted by the loops 11 to 15 forms a series of undulations crossing the front transverse edge 6 so as to constitute or reinforce a hinge about which the flap opens by performing generally pivoting movement about the axis AX.

The loop 12 is connected to the loops 14 and 15 by two strands. The loop 13 is connected to the loop 15 by one of those strands, and it is connected to the right side loop 18 by another strand. Likewise, the loop 11 is connected to the loop 14 by one of its strands, and it is connected to the left side loop 17 by its other strand.

The left side loop 17 is thus connected by a strand of the tie 1 to the loop 11, and it is connected to the right side loop 18 by a strand 19 that extends in rectilinear manner against the flap 4, parallel to its rear transverse edge 7. The right side loop 18 is thus connected by the strand 19 to the left side loop 17, and this right side loop 18 is connected by its other strand to the loop 13.

As can be seen in FIG. 1, the strands of the side loop 17 cross over each other where they extend across the left side edge 8, and in the same manner, the strands of the right side loop 18 also cross over each other where they extend across the right side edge 9.

When the flap is closed, as in FIG. 1, the crossed strands of the left side loop 17, and the crossed strands of the right side loop 18 are slack, i.e. they are not under tension in the region where they cross each other. When the flap opens by pivoting about the axis AX, these crossed strands become tensioned so as to limit the opening angle of the flap, so that it does not strike the windshield.

The flap 4 has a flap body extending the dashboard body 2 and reinforcement (not shown), such as a plate fastened to the bottom face of the flap body. This plate includes various ribs on its top face forming slots facing towards the bottom face of the flap body, and between which the portions of the tie 1 that are situated against the flap body are engaged. Specifically, the loops 14 and 15 of the tie 1 are held in position by being engaged in slots corresponding to the reinforcement, and the straight strand 19 is also engaged in a slot formed on the top face of the flap reinforcement.

The flap reinforcement is fastened via its top face, i.e. via the edges of the ribs of its top face, to the bottom face of the flap body, e.g. by vibration welding, after the tie has been installed in the slots of the reinforcement. This operation thus serves simultaneously to reinforce the flap and to fasten the tie to the flap.

As can be seen in the figures, the tie 1 is provided with overmolded additional elements whereby it is fastened to the dashboard body 2 and to the flap body 4, in a manner that is fast and accurate.

Each of the loops 11, 12, and 13 thus includes a respective overmolded element, these elements being referenced 21, 22, and 23. In analogous manner, the loops 17 and 18 also have respective overmolded elements, these elements being referenced 24 and 25, and the straight strand 19 also has an overmolded element that is referenced 26.

The elements 21 to 26 are overmolded on portions of the tie 1 in an operation prior to installing the tie in the arrangement. In practice, the starting material is a tie 1 that is cut to a predetermined length and that has its ends secured to each other by stitching.

Once that linear tie has thus been transformed into a loop of predetermined length, the various elements 21 to 26 are overmolded on portions of the tie at predetermined distances apart from one another along the tie. In this context, and as shown in FIG. 1, the element 21 is overmolded on the region of the tie 1 that corresponds to its ends that are united by stitching.

Once the tie 1 has been fitted with its overmolded elements 21 to 26, it is installed in the arrangement by engaging each overmolded element in a corresponding housing in the dashboard body and/or in the flap body.

The housings are not visible in the figures and they are situated in the bottom face of the dashboard body 2, and each housing is of a shape that is generally complementary to the shape of the overmolded element that it is to receive.

Figure 2:
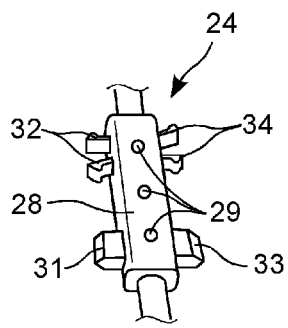
FIG. 2 is a view showing an additional element overmolded on a tie in accordance with the invention.

As shown in FIG. 2, the overmolded element 24 that is fitted to the loop 17 of the tie 1 includes a main body 28 surrounding the tie 1 while also presenting a shape that is generally that of a rectangular block. The top face of this main body 28 bears against the bottom of the corresponding housing, level with the bottom face of the dashboard body.

This top face has three holes 29 that correspond to studs for holding the tie 1 in a centered position in the additional element 24 while this additional element 24 is being overmolded around the corresponding tie portion. These same three holes advantageously also serve to receive corresponding tabs that project from the bottom of the housing into which the element 24 is engaged, so as to position the element in accurate manner along the longitudinal direction in its housing.

The left side face of the body 28 has firstly a tab 31 that projects sideways, pointing radially relative to the tie 1, and secondly a pair of prongs 32 that project sideways and also pointing radially relative to the tie 1.

In analogous manner, the right side face of the body 28 also includes a tab 33 projecting sideways and pointing radially relative to the tie 1, and a pair of prongs 34 that project sideways and that point radially relative to the tie 1.

The tab 33 is situated in register with the tab 31, and the pair of prongs 34 is situated in register with the pair of prongs 32, the element 24 being, in general terms, a part that has two planes of symmetry.

As can be understood, the tabs 31 and 32 are received in corresponding portions of the housing that receives the element 24 so as to position this element in rotation about the axis that coincides locally with the tie 1, and furthermore, the pairs of prongs 32 and 34 serve to snap-fasten the element 24 in its housing, once the element has been engaged in the housing by an assembly operative.

In other words, the element 24 has means that are complementary relative to the housing that receives it for ensuring that it is properly positioned both longitudinally and in rotation and ensuring that it is blocked in position, merely by being engaged in its housing. Consequently, this makes it possible to ensure that the tie 1 is positioned with respect to its loop 17 both simply and accurately.

The same applies to the element 25 having the same shape as the element 24 and that serves to engage in another housing so as to ensure that the right side loop 18 is positioned both simply and accurately.

For the elements 21, 22, and 23, each of them mainly comprises a body with a top face that is provided with holes that correspond to studs for holding the tie 1 in a centered position within the additional elements 21, 22, and 23 while those additional elements 21, 22, and 23 are being overmolded around the corresponding tie portion. These same holes advantageously serve to receive studs situated in the bottoms of the housings in which these elements are engaged.

The element 26 that contributes to fastening the straight strand 19 to the flap 4 also comprises a main body 36 having a side face provided with a tab 37. The top face of this main body 36 has holes 38 that correspond to studs for holding the tie 1 in a centered position in the additional element 26 while the additional element 26 is being overmolded around the corresponding tie portion. These same holes advantageously serve to receive corresponding pins projecting from the bottom of a housing in the bottom face of the flap body 4 in which the element is to be engaged, this housing also having a region that is to receive the side tab 37.

Additionally, the top face of the main body 36 has a rib 39 that is to bear against the bottom of the housing in which this element is to be engaged.

This rib 39 runs parallel to the direction of the tie 1 in the element 26 and it projects from the top face so as to enable the element 26 to be vibration-welded to the bottom face of the flap body 4.

Specifically, installing the tie consists in placing it together with the element 26 in the corresponding slots of the flap reinforcement, and in fastening the top face of the flap reinforcement to the bottom face of the flap body 4 by vibration-welding or by some other technique.

During the vibration-welding operation, firstly the reinforcement is secured to the flap body, and secondly the element 26 is also welded to the flap body via the rib 39.

As mentioned above, the tie 1 has overmolded elements that enable it to be fastened quickly and accurately to the dashboard body. As mentioned above, it should also be observed that each overmolded element has a set of holes for receiving corresponding studs during assembly, but that the configurations of these holes differ from one element to another so that they constitute keying means making it impossible to install an overmolded element in a housing other than the housing that is to receive it.

Furthermore, the tie 1 may be provided with other overmolded members, having functions other than those of the elements 21 to 26. Thus, in the example shown in the figures, the tie 1 is also provided with members that are referenced 41, and that surrounds the tie so that each of them locally forms a sheath with a bend for orienting the tie correctly while it is being installed.

In general terms, the lengths of the overmolded tie portions lie in the range 10 millimeters (mm) to 80 mm, and the thickness of the overmolded plastics material lies in the range 0.5 mm to 3 mm, the overmolding material being selected from any type of material that is compatible with the material of the tie, such as polypropylene, for example.

As shown in the figures, the outside shape of the additional element may be that of a rectangular block, a torus, or any other shape suitable for positioning the tie in the airbag arrangement. This outside shape advantageously includes portions such as holes, tabs, etc., that perform a keying function so as to prevent the additional element being installed wrongly.

As for the tie 1 itself, it is advantageously of round or oval section and it contains fibers of polyaramid and/or polyester so as to present the same mechanical strength behavior at all temperatures.

The tie 1 advantageously presents breaking strength greater than 150 decanewtons (daN) and preferably greater than 500 daN. Its breaking elongation is less than 20%, and preferably less than 10%. Its elongation at 300 daN is less than 25% and preferably 10% or 15%.

Figure 3:
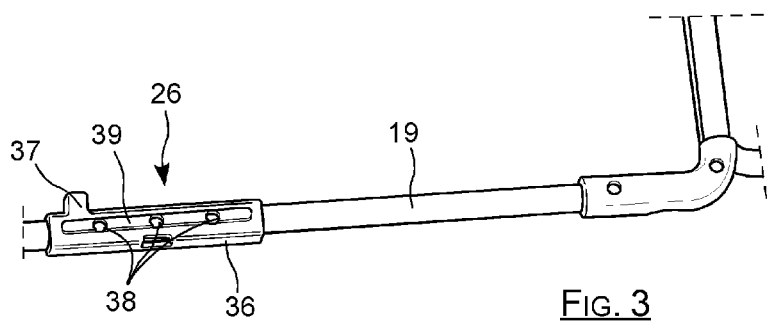
FIG. 3 is a detail view of the tie of FIG. 1.

In the example of FIGS. 1 to 3, the tie is fastened to the dashboard body and to the flap by having its overmolded additional elements snap-fastened in housings provided firstly by the dashboard body itself, and secondly by the flap body itself. In other words, the tie is fastened to the flap body and to the dashboard body in a direct manner.

Figure 4:
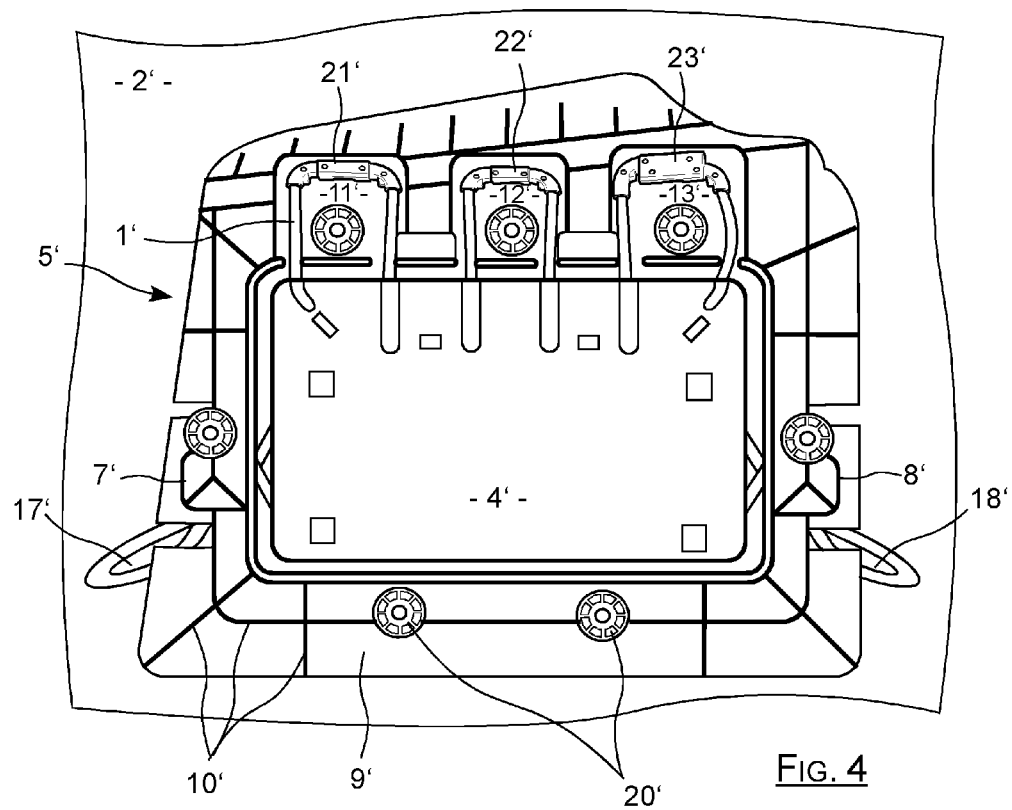
FIG. 4 is a view from beneath showing a flap and a firing channel surrounding the flap to constitute an assembly that is to be fitted to the bottom face of a dashboard body in accordance with a second embodiment of the invention.
Figure 5:
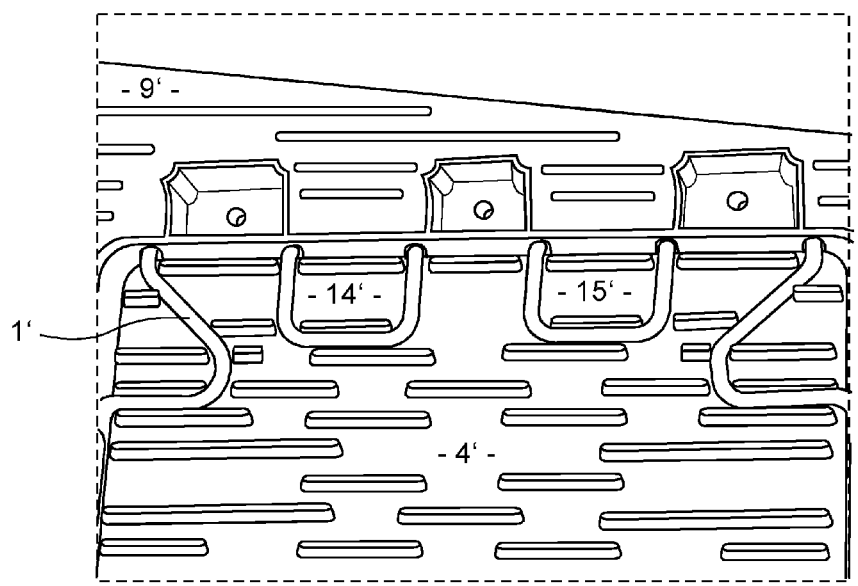
FIG. 5 is a plan view showing the firing channel together with the flap reinforcements that are used in accordance with the second embodiment of the invention.

However, it is also possible for the tie to be fastened to the dashboard body via a firing channel, and for it to be fastened to the flap body via a reinforcement fastened to the flap body, this corresponding to a second embodiment of the invention as shown in FIGS. 4 and 5.

In this other embodiment of the invention, the arrangement comprises a tie 1' that is fastened to the dashboard body 2' via a firing channel 5' surrounding a flap hinged to the assembly formed by the dashboard body and the flap. FIGS. 4 and 5 show reinforcement of the flap, given reference 4', the flap being constituted by a flap body fitted to the top face of the flap reinforcement 4' and fastened thereto, e.g. by vibration-welding.

The tie 1' follows a general arrangement that is entirely analogous to that of the first embodiment shown in FIGS. 1 to 3. Once again the tie 1' has four loops 11', 12', 13', 17', and 18' that are situated outside the outline of the flap, and two loops 14' and 15' that are situated inside this outline so as to be fastened to the flap by means of reinforcement for the flap.

The loops 11' to 15' reinforce the hinge of the flap, whereas the loops 17' and 18', which are side loops, are for retaining the loop while it is opening in order to prevent it from striking the windshield. As shown in FIG. 4, the side loops 17' and 18' are not yet fully installed in the firing channel, but they are to be passed respectively around corresponding reinforcements of the slot given references 7' and 8'.

In general terms, the firing channel 5' has a main wall 9', or curved plate, that is to have its top face fastened to the bottom face of the dashboard body where the arrangement is to be installed, and the main wall is reinforced by a series of ribs 10' giving the assembly a greater thickness, and appropriate stiffness.

In addition, the firing channel has a set of studs, six studs in this example, that are coplanar and that are given the reference 20', which studs are for receiving a standardized inflatable airbag module for fastening rigidly to the firing channel, and thus to the dashboard body.

As can be seen in the figures, the tie 1' is likewise provided with overmolded additional elements, in particular in the loops 11', 12, and 13', these additional elements being referenced 21', 22', and 23'. In analogous manner, the tie 1' is likewise provided with overmolded additional elements (not shown) in particular in association with the loops 17' and 18', and in association with the flap 4', these additional elements being equivalent to those referenced 24, 25, and 26 in the first embodiment.

These additional elements that are overmolded on the tie 1 are entirely analogous to the overmolded additional elements in the context of the first embodiment of the invention: they are elements made of a plastics material and each of them is overmolded on a portion of the tie, each additional element presenting an outside shape enabling it to be engaged and snap-fastened in a corresponding housing of complementary shape.

In this second embodiment of the invention, the housings whereby the tie 1 is fastened to the dashboard body form portions of the firing channel.

Thus, in this second embodiment of the invention, the arrangement is installed by putting the flap reinforcement 4' into place in the inside opening of the firing channel 5' prior to installing the tie 1 in a predetermined position, i.e. in such a manner that it describes the loops 11' to 18'.

The tie is then fastened to the firing channel 5' by snap-fastening additional elements 21' to 23' that it carries, and it is also fastened to the flap reinforcement 4' by snap-fastening the additional element equivalent to the additional element 26 of the first embodiment and by being passed between the various ribs forming parts of the flap reinforcement, as shown in FIG. 5, these ribs extending parallel to one another so that together they define slots. Additionally, the tie is passed around reinforcements 7' and 8' of the firing channel in order to form loops 17' and 18' corresponding to the strands of the tie 1 that serve to retain the flap while it is opening.

When the tie is fully in position on these various components, the assembly constituted by the firing channel 5' and the flap reinforcement 4', together with the tie 1' that connects them together is fitted to the bottom face of the dashboard body so as to fasten the entire assembly to the dashboard body, e.g. by vibration-welding.

In this situation, the firing channel 5' is fastened to the dashboard body around the flap body closing the opening for passing the inflatable airbag, the flap body being defined, for example, by a rectangular precut formed in the bottom face of the dashboard body.

Simultaneously, the reinforcement 4' is also fastened by vibration-welding to the bottom face of the flap body: the top edges of the ribs of the flap reinforcement that extend parallel to one another as shown in FIG. 5 are welded to the bottom face of the flap body.

Once this welding operation has been performed, the firing channel is rigidly secured to the dashboard body, and the flap body is rigidly secured to the flap reinforcement, and the tie 1' is also accurately positioned and rigidly secured to these components.

In particular, the tie 1' is fastened to the dashboard body via the firing channel and the housings in the firing channel in which the additional elements 21', 22', and 23' that are overmolded on portions of the tie are snap-fastened. The tie is fastened to the flap by the reinforcement of the flap and by the ribs it includes.

The invention claimed is:

1. An inflatable airbag flap arrangement in a motor vehicle dashboard, the arrangement comprising a flap hinged to a dashboard body in order to open when the airbag is inflated, and a linear tie fastened to the flap and to the dashboard body in order to limit the amplitude of the movement of the flap when it opens, the arrangement being characterized in that additional elements are overmolded along portions of the tie, these portions of the linear tie being embedded in the material of the additional elements, said overmolded additional elements having specific outside shapes suitable for being snap-fastened in corresponding housings rigidly secured to the flap and/or to the dashboard body, wherein the tie is positioned in the airbag arrangement and is fastened to said arrangement by snap-fastening of the additional elements in the corresponding housings.

2. An arrangement according to claim 1, wherein at least one of the additional elements is overmolded along at least one portion of the tie and has an outside shape that co-operates with the shape of the housing that receives it to hold the position and the direction of the tie locally.

3. An arrangement according to claim 1, wherein at least one of the additional elements is overmolded along at least one portion of the tie and has an outside shape with one or more snap-fastener prongs for snap-fastening in the corresponding housing.

4. An arrangement according to claim 1, wherein at least one of the additional elements is overmolded along at least one portion of the tie and has an outside shape including one or more ribs for enabling said element to be bonded by welding to the housing in which it engages.

5. An arrangement according to claim 1, wherein the tie is a linear tie forming a single closed loop.

6. An arrangement according to claim 1, wherein the tie constitutes a single closed loop, having its ends secured to each other by stitching.

7. An arrangement according to claim 1, having a firing channel rigidly secured to the dashboard body and surrounding the flap, wherein the flap includes a flap body and flap reinforcement rigidly secured to each other, and wherein the tie is fastened to the dashboard body and/or to the flap by the additional elements overmolded on the tie and snap-fastened in corresponding housings formed in the firing channel and/or in the flap reinforcement, which firing channel and flap reinforcement are rigidly secured respectively to the dashboard body and to the flap body.

8. A motor vehicle fitted with an arrangement according to claim 1.

\* \* \* \* \*